3,394,371
VEHICLE MOTION NULLING SYSTEM
John Mahler, Litchfield, N.H., assignor to Raytheon Company, Lexington, Mass., a corporation of Delaware
Filed Oct. 27, 1966, Ser. No. 589,997
4 Claims. (Cl. 343—5)

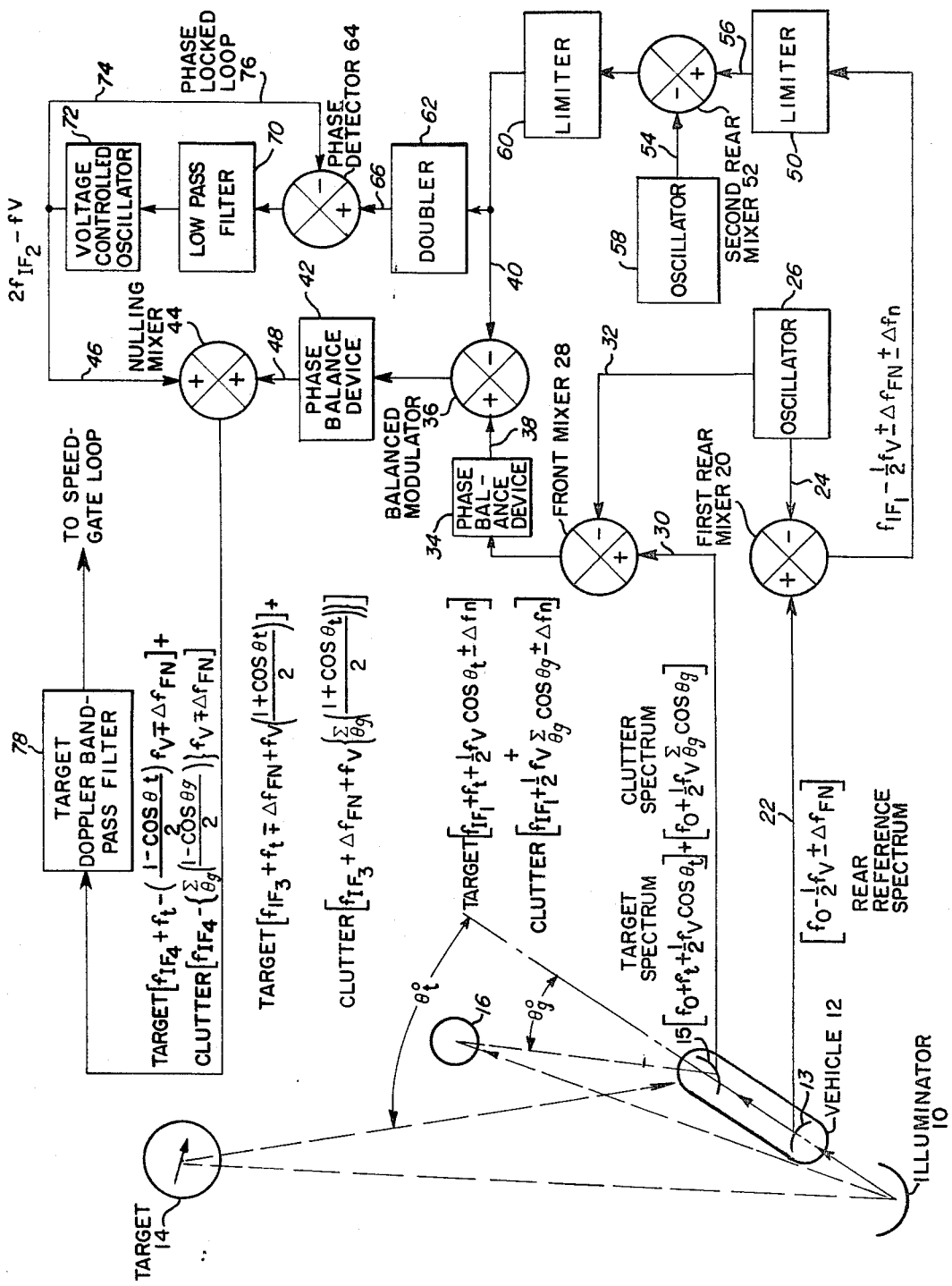

ABSTRACT OF THE DISCLOSURE

An apparatus used in combination with a Doppler energy detector for nulling Doppler frequency components caused by the motion of the detector relative to an energy source. A first and second heterodyne arrangement generate first and second spectra from the detected energy. The first spectrum includes a positive Doppler detector motion component and noise. The second spectrum includes a negative Doppler motion component and noise. A first mixer cancels the noise by algebraic subtraction of the first and second spectra. The Doppler detector motion components are cancelled by algebraic addition in a second mixer of the first mixer output and a frequency translated second spectrum.

---

This invention is concerned with bistatic, continuous wave radar systems and, more particularly, with a system capable of nulling vehicle motion therein in order to isolate the homing radar receiver in the moving vehicle from the effects of vehicle motion.

Prior art systems utilize complex data processing equipment for removing vehicle acceleration and velocity terms during homing. However, for short range guided missiles there is not sufficient time for correcting the initial errors in a guided missile launch. Additionally, the proximity of ground clutter signals to target signals in the speedgate of earlier systems places severe limitations on their tracking capabilities. This is particularly true for a pursuit approach for which the ground signal exceeds the target signal in velocity, thus requiring complex ground signal gating apparatus.

Furthermore, prior art systems utilize large, complex speedgates in small, crowded vehicles. These speedgates require fast sweep, sweep-stop, and sweep back-up circuits in order to provide a large number of opportunities for reacquisition over a wide range of Doppler error. However, in small, short range vehicles such circuits are undesirable by reason of their complexity and size, and in larger vehicles because of reliability and cost reasons.

The present invention overcomes the problems of the prior art by keeping vehicle acceleration and velocity components out of the speedgate in order to make the ground appear to stand still, and also it removes local oscillator noise. In a preferred embodiment of the invention, a balanced modulator subtracts the rear vehicle signal from the front vehicle signal so that frequency modulation, local oscillator noise may be cancelled. A doubler circuit generates a synthetic noise free, double frequency, rear vehicle signal which is then passed to a nulling mixer where it is added to the output of the balanced modulator. The sum produced by the nulling mixer is next passed to a target Doppler bandpass filter in order to produce a substantially local oscillator noise free signal having only target velocity components. The speedgate of the continuous wave tracking system receiver then produces a direct current signal showing target direction in response to the output of the target Doppler bandpass filter. This is next automatically computed to homing guidance information.

Other objects, features, and embodiments of the invention will become apparent from the following description of a preferred embodiment taken in conjunction with the accompanying drawing, wherein the figure is a diagrammatic representation of a preferred embodiment of the vehicle motion nulling system.

The figure depicts a novel vehicle motion nulling system located in vehicle 12 and which includes a first rear mixer 20 for multiplying the output of oscillator 26 by the rear vehicle spectrum and applying the difference signal to first limiter 50; a second rear mixer 52 for multiplying the output of oscillator 58 by the limited difference signal; a second limiter 60 for limiting the difference signal generated by second rear mixer 52 before applying it to balanced modulator 36 and doubler 62; a phase detector 64 for subtracting the output of voltage controlled oscillator 72 from the output of doubler 62; low pass filter 70 connected between phase detector 64 and voltage controlled oscillator 72; a front mixer 28 for subtracting the frequency of oscillator 26 from the front target and clutter spectrum; a balanced modulator 36 for multiplying the output of limiter 60 by the output of phase balance device 34; a nulling mixer 44 for multiplying the output of voltage controlled oscillator 72 by the output of phase balanced device 42 and taking the resulting sum signal; and, a target Doppler bandpass filter 78 for receiving the output of nulling mixer 44. The output of filter 78 is the Doppler shifted signal due to target motion converted to an intermediate frequency substantially without local oscillator noise or vehicle acceleration and velocity components.

Bistallic, continuous wave radar systems have a transmitter or illuminator 10 at one location and the receiver in a vehicle 12 such as a giuded missile that is capable of rapid acceleration and high velocity with respect to the illuminator 10. Such systems are designed to track only one target 14 from the time the vehicle 12 begins to accelerate and to provide the vehicle 12 with homing commands needed to guide the vehicle 12 to the target 14. A reflector 16 is located on the ground to schematically represent ground clutter signals generated by illuminator 10 and reflected back to an antenna 15 at the front end of vehicle 12. In addition, other signals generated by illuminator 10 are reflected by target 14 to antenna 15 at the front end of vehicle 12 which produce the designated target spectrum. Illuminator 10 also transmits a signal to an antenna 13 at the rear end of vehicle 12 which then generates the described rear reference spectrum.

The various symbols used in the figures are shown below:

$\theta_t$ = homing lead angle of vehicle 12
$f_0$ = radio frequency of illuminator 10
$f_t$ = Doppler shift due to the motion of target 14 as seen by illuminator 10 which is assumed to be stationary
$\theta_g$ = lead angle for ground reflector 16, one of a large number $f_v$=Doppler shift at illuminator 10 due to motion of vehicle 12

$\Delta f_{FN}$=instantaneous deviation at the rear reference antenna 13 due to engine exhaust $\Delta f_n$=instantaneous deviation due to radio frequency oscillator instability The generation of $f_v$ or the Doppler shift due to vehicle motion will now be described. First rear mixer 20 receives a rear reference spectrum signal on line 22 which enters the rear antenna 13 of vehicle 12 from illuminator 10 as vehicle 12 moves away from illuminator 10. This signal has the following frequency:

$$f_0 - \tfrac{1}{2}f_v \pm \Delta f_{FN}$$

The factor ½ arises because all frequency designations in this specification are referred to illuminator 10 as the fixed reference point. Doppler shift is always $$f_d = 1/\lambda \; dP/dt$$

where $\lambda$ is the radio frequency wavelength and $dP/dt$ is the rate of change of path length. Hence, the Doppler shift at vehicle 12 is one-half that at illuminator 10.

Oscillator 26 applies a signal having the following value to first rear mixer 20 which then changes the rear reference spectrum signal to a suitable intermediate frequency:

$$f_0 - f_{IF_1} \mp \Delta f_n$$

Accordingly, first rear mixer 20 multiplies the signal frequency generated by oscillator 26 by the rear reference spectrum signal to produce the following intermediate frequency signal which is limited in limiter 50 before being applied to input line 56 of second rear mixer 52:

$$f_{IF_1} - \tfrac{1}{2}f_v \pm \Delta f_{FN} \pm \Delta f_n$$

Oscillator 58 applies a signal having a frequency $f_{IF_1} - f_{IF_2}$ to second rear mixer 52 where its frequency is multiplied by the output signal generated by limiter 50, and the difference of these signals is applied to limiter 60.

The conversion to a suitable intermediate frequency which takes place in rear mixers 20 and 52 causes the perennial problem of local oscillator noise which occurs in every semiactive continuous wave homing radar. In order to fully understand how the invention operates, the magnitude of the local oscillator noise problem must be appreciated. If the maximum random frequency modulation noise power at any Doppler frequency passed by the vehicle speedgate filter is set equal to the signal power at the antenna terminals then $$Pr_t = Pr_c J_1^2(\Delta f_v / f_d)$$

where:

$Pr_t$=signal power
$Pr_c$=clutter power
$\Delta f_v$=peak deviation of frequency modulation sine wave whose power equals the total local oscillator noise power in speedgate bandwidth centered at $f_d$
$f_d$=Doppler frequency of interest, and $$\Delta f_v = 2f_d(Pr_t/Pr_c)^{1/2}$$

Hence $$\Delta f_v = \frac{2f_d R_c (R_c - R_v)}{R_t (R_t - R_v)} \left(\frac{\sigma_t}{\sigma_c}\right)^{1/2}$$

where $R_c$=clutter range
$R_v$=vehicle range
$R_t$=target range
$\sigma_t$=target cross section
$\sigma_c$=clutter cross section and, all ranges are from illuminator 10.

In continuous wave radar systems $\Delta f_v$ for vehicle 12 is in the fractional cycle region within the speedgate bandwidth, generally about one kilocycle. A semi-active receiver has a local oscillator noise requirement that is more severe than that which applies to the transmitter of an active system such as a tracking-illuminating radar set. Since the common local oscillator devices do not provide stability, some type of noise degeneration is utilized in most semi-active systems. The physical reason for the difference between semi-active and active systems is that the local oscillator is the semi-active system cannot benefit from receiver coherence.

This invention utilizes balanced modulator 36 for taking the difference between the front and rear vehicle signals in order to cancel local oscillator noise before delivering the difference signal to the speedgate for tracking and extraction of angle error data. The front reference spectrum comprising a target spectrum $$f_0 + f_t + \tfrac{1}{2}f_v \cos \theta_t$$

plus a clutter spectrum $$f_0 + \tfrac{1}{2}f_v \sum_{\theta_g} \cos \theta_g$$

is applied to front mixer 28 via line 30 wherein the frequency of the output from oscillator 26 is multiplied by the front reference spectrum and the difference is phase shifted in phase balance device 34 before being applied to input 38 of balanced modulator 36. The limited rear vehicle signal produced by limiter 60 is applied to input line 40 of balanced modulator 36 where it is multiplied by the front spectrum signal produced by phase balance circuit 34. The output signal generated by balanced modulator 36 does not include local oscillator noise and is applied to phase balance circuit 42 for being shifted in phase. Note that an unambiguous system is used because this invention places all clutter frequencies below the carrier or intermediate frequency. Thus, clutter competes only with outgoing targets as long as fold-over or unwanted frequencies is avoided. The following combined spectrum signal is then applied to input line 48 of nulling mixer 44 by phase balance circuit 42:

target spectrum $$f_{IF_3} + f_t \mp \Delta f_{FN} + f_v \left(\frac{1 + \cos \theta_t}{2}\right)$$

plus clutter spectrum $$f_{IF_3} \mp \Delta f_{FN} + f_v \sum_{\theta_g} \left(\frac{1 + \cos \theta_g}{2}\right)$$

The limited rear spectrum signal is applied by limiter 60 to doubler 62 where that signal is multiplied by two and the product thereof is applied to input line 66 of phase locked loop 76. Frequency doubler 62 is placed at the input to phase locked loop 76 in order to prevent excessive varactor noise from appearing at the input of nulling mixer 44.

The purpose of phase locked loop 76 is to clean up the rear signal which represents vehicle motion, and accordingly loop 76 operates as an active filter. Phase detector 64 subtracts the output of voltage controlled oscillator 72 from the output of doubler 62 and applies the difference to low pass filter 70. The bandwidth of phase detector 64 is equal to the maximum excursion of $f_v$, i.e. the Doppler shift due to vehicle motion with reference to illuminator 10. Low pass filter 70 is a narrow band device for filtering the output of phase detector 64. The low pass filter bandwidth has a lower limit determined by the maximum delay which the tracking system can tolerate, i.e. by the maximum target acceleration, and an upper limit which is equal to the skirt of the clutter notch or the edge of the response curve describing the output versus frequency for filter 70. These two limits do not cross in continuous wave semi-active homing radars. The direct current output signal generated by low pass filter 70 is transferred to voltage controlled oscillator 72 which produces a term including $f_v$, or the Doppler shift due to vehicle motion less noise components at its output. Hence, the following is fed to both input line 46 of nulling mixer 44 and back to input line 68 of phase detector 64:

$$2f_{IF_2} - f_v$$

The output signals from voltage controlled oscillator 72 and phase balancing device 42 are added in nulling mixer 44 where a sum signal is produced without sensitivity degradation due to local oscillator noise. The purpose of nulling mixer 44 is to substantially remove the effects of motion. The following indicates the output of nulling mixer 44:

target $$f_{IF_4} + f_t - \left(\frac{1-\cos\theta_t}{2}\right)f_v \mp \Delta f_{FN}$$

plus clutter $$f_{IF_4} - \left[\sum_{\theta_g}\left(\frac{1-\cos\theta_g}{2}\right)\right]f_v \mp \Delta f_{FN}$$

Hence, it is apparent from the foregoing that clutter is stably related to $f_{IF_4}$ and errors due to such things as flame noise and the problem of the vehicle not being in line. The term $f_v$ or the Doppler shift due to vehicle motion is substantially removed from the clutter term because $\cos\theta_g$ is close to zero. Moreover, intermediate frequency $f_{IF_4}$ is a fixed frequency.

The output spectrum of nulling mixer 44 is then passed to target Doppler bandpass filter 78 which generates the following:

target spectrum $$f_{IF_4} + f_t - \left[\frac{2-(\cos\theta_t + \cos\theta_v)}{2}\right]f_v \mp \Delta f_{FN}$$

plus clutter spectrum $$f_{IF_4} - \left\{\sum_{\theta_g\theta_{eg}}\left[\frac{3-(\cos\theta_g + \cos\theta_{eg} + \cos\theta_v)}{3}\right]f_v\right\} \mp \Delta f_{FN}$$

where:

$\theta_v$ = angle between the radial and vehicle vector
$\theta_{eg}$ = angle between vehicle vector and clutter line of sight from the vehicle The foregoing expression applies particularly when the vehicle motion is nearly radial with clutter at a grazing angle, i.e. for the low flying short range case. Hence, the clutter spectrum is forced entirely into the negative Doppler region regardless of how much the expression tends to spread it out, and only frequency modulation noise due to flame modulation remains. Thus, the output of target Doppler bandpass filter 78 is substantially equal to the Doppler shift due to target motion or $f_t$ converted to an intermediate frequency $f_{IF_4}$. Accordingly, local oscillator noise has been cancelled, and vehicle acceleration and velocity components are not allowed to enter the speedgate, thus giving the effect of the ground standing still.

The speedgate (not shown) includes a frequency locked loop for maintaining the Doppler shifted echo of the target 14 in a narrow band filter centered at a convenient frequency by automatically shifting the speedgate intermediate frequency. The output of the narrow band filter is demodulated in order to obtain direct current signals describing the direction of the target 14 with respect to the receiving antenna from which homing guidance is automatically computed by a computer (not shown).

Accordingly, this invention provides a novel system for removing local oscillator noise and for keeping vehicle acceleration and velocity components out of the speedgate in order to make the ground appear to stand still. A balanced modulator 36 subtracts the rear vehicle signal from the front vehicle signal so as to cancel local oscillator noise. A doubler circuit 62 generates a synthetic noise free, double frequency, rear vehicle signal which is applied to nulling mixer 44 for being added to the output of balanced modulator 36. A target Doppler bandpass filter 78 receives the sum produced by nulling mixer 44 and generates a substantially noise free signal having only target velocity components.

With this invention, vehicle acceleration and velocity terms are filtered out of the signal prior to extracting the desired information rather than as a part of the data processing operation. A synthetic noise free reference signal is used to null vehicle motion by addition to the front vehicle signal while local oscillator noise is cancelled in a parallel balanced modulator 36. A fixed filter 78 is utilized for removing ground clutter. Also, the homing problem for short range guided missiles is solved by this invention, and the problem of homing on very slow incoming targets in the presence of ground signals generated by vehicle motion is solved by placing such ground signals in the negative Doppler region. Clutter is almost entirely removed from competition with incoming targets, however, slow; and, engine exhaust noise on the rear vehicle reference signal is not carried by clutter near the Doppler shift due to target motion. The problem of placing large complex speedgates in small, crowded vehicles is alleviated.

It should be appreciated that the invention is not limited to the foregoing description of a preferred embodiment. For instance, where there is no noise degeneration and the vehicle 12 includes a multi-cavity klystron and its power supplies, the nulling mixer 44 and phase locked loop 76 may be omitted because the desired vehicle motion nulled signal can be obtained by simply taking the sum output of balanced modulator 36. Consequently, the invention embraces the full scope of the following claims.

What is claimed is:

1. A Doppler object location system comprising:
    an illuminator for radiating energy;
    a receiver moveable relative to the illuminator and adapted to detect the energy, the receiver comprising:
    a first heterodyne arrangement for generating a first frequency spectrum from the detected energy including a positive Doppler receiver motion component and noise;
    a second heterodyne arrangement for generating a second frequency spectrum from the detected energy including a negative Doppler receiver motion component and noise;
    a band limited frequency multiplier for translating the second spectrum to a higher frequency range;
    a first mixer for algebraically forming a difference spectrum from the first and second spectrum; and
    a second mixer for algebraically forming a sum spectrum from the difference and translated second spectrums.

2. An apparatus in combination with a Doppler energy detector for nulling detected Doppler frequency components caused by the motion of the detector relative to an energy source comprising:
    a first heterodyne arrangement for generating a first frequency spectrum from the detected energy including a positive Doppler detector motion component and noise;
    a second heterodyne arrangement for generating a second frequency spectrum from the detected energy including a negative Doppler detector motion component and noise;
    a first mixer for noise cancellation by algebraic subtraction of the first and second spectrum;
    a band limited frequency multiplier for translating the second spectrum to a higher frequency range exclusive of noise; and
    a second mixer for Doppler detector motion component cancellation by algebraic addition of the first mixer output and the translated second spectrum.

3. An apparatus according to claim 2, characterized in that the frequency multiplier comprises a frequency doubler for multiplying all the frequency components of the second spectrum by a factor of two; and
   a phase lock loop in series with the doubler for band limiting the translated second spectrum.

4. An apparatus according to claim 2, characterized in that the apparatus further comprises a bandpass filter in series relation with the second mixer.

References Cited

UNITED STATES PATENTS

| | | | |
|---|---|---|---|
| 2,950,477 | 8/1960 | Alpers | 343—13 |
| 3,074,062 | 1/1963 | Alpers | 343—13 |
| 3,130,404 | 4/1964 | Fried | 343—14 |
| 3,277,430 | 10/1966 | Hagemann et al. | 343—8 X |

RODNEY D. BENNETT, *Primary Examiner.*

C. L. WHITHAM, *Assistant Examiner.*

UNITED STATES PATENT OFFICE
CERTIFICATE OF CORRECTION

Patent No. 3,394,371

July 23, 1968

John Mahler

It is certified that error appears in the above identified patent and that said Letters Patent are hereby corrected as shown below:

Column 2, line 39, "Bistallic" should read -- Bistatic --.
Column 4, line 21, $$f_0 + 1/2 f_v \sum_{\phi_g} \cos \theta_g \quad \text{should read} \quad f_0 + 1/2 f_v \sum_{\theta_g} \cos \theta_g$$

same column 4, line 47, the equation should appear as shown below:

$$f_{IF_3} + \Delta f_{FN} + f_v \left[ \sum_{\theta_g} \left( \frac{1 + \cos \theta_g}{2} \right) \right]$$

Signed and sealed this 10th day of March 1970.

(SEAL)
Attest:

EDWARD M. FLETCHER, JR.
Attesting Officer

WILLIAM E. SCHUYLER, JR
Commissioner of Patents